J. S. PRATT.
WATER COOLER FOR REFRIGERATORS.
APPLICATION FILED AUG. 23, 1909.
958,890.
Patented May 24, 1910.
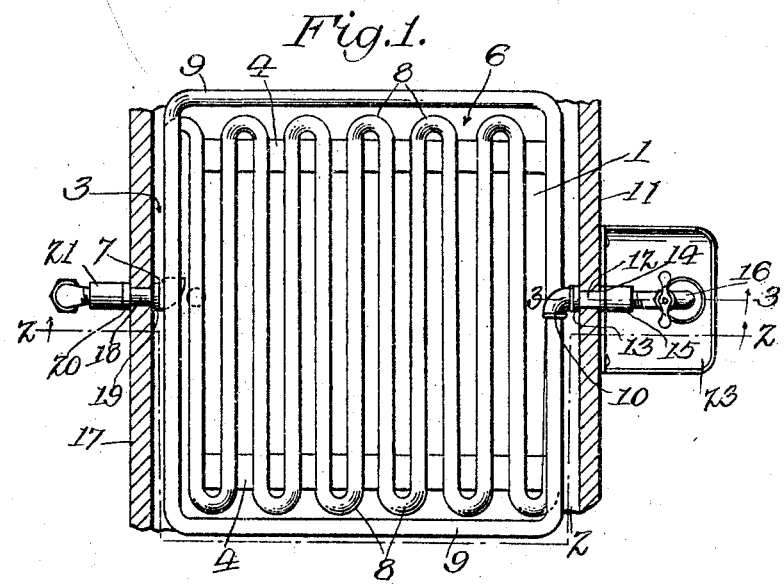
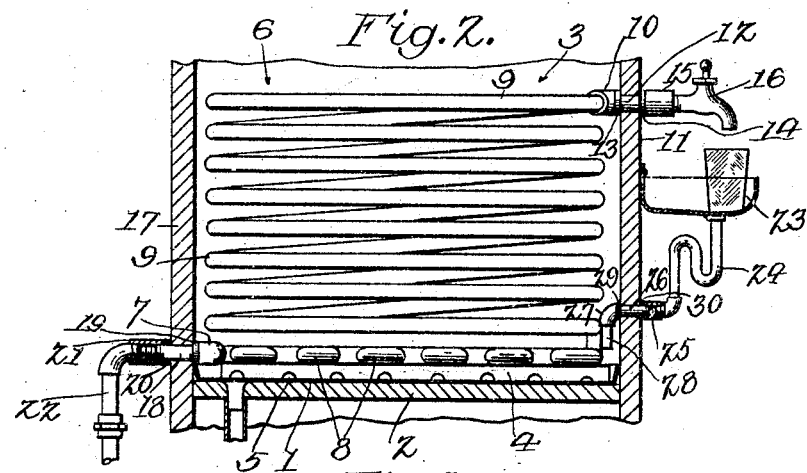
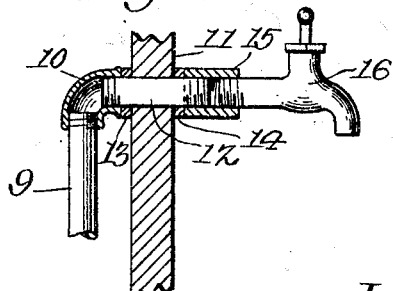
Witnesses:
Inventor
James S. Pratt.
by Simer G. Wells,
Attorney.

UNITED STATES PATENT OFFICE.

JAMES S. PRATT, OF LOS ANGELES, CALIFORNIA.

WATER-COOLER FOR REFRIGERATORS.

958,890. Specification of Letters Patent. Patented May 24, 1910.

Application filed August 23, 1909. Serial No. 514,166.

*To all whom it may concern:*

Be it known that I, JAMES S. PRATT, a citizen of the United States, residing at Los Angeles, California, have invented a new and useful Water-Cooler for Refrigerators, of which the following is a specification.

My object is to construct an ice-chest or refrigerator for household use and place a cooling-coil in the ice-chest and attach it to the water-system, so as to furnish cold water for drinking and the like; and my invention consists of the novel features herein shown, described and claimed.

In the drawings: Figure 1 is a top plan view illustrating my improved water-cooler, parts of the ice-chest being omitted or broken away to show the coil. Fig. 2 is a sectional elevation on the line 2—2 of Fig. 1. Fig. 3 is an enlarged sectional detail on the line 3—3 of Fig. 1.

Referring to the drawing in detail, the drip-pan 1 rests upon the floor 2 of the ice-chamber 3, the coil-supporting-blocks 4 are placed in the drip-pan 1 and have notches 5 in their lower faces to allow the drip water to flow. The coil 6 starts at the inlet-elbow 7 and runs back and forth several times across the supporting-blocks 4 thus forming the floor-bends 8, and then upwardly and several times around the inner face of the vertical walls forming the ice-chamber 3, thus forming the box-bends 9 said box-bends being substantially square in plan, and ends at the outlet-elbow 10; said coil being in the form of a box having four sides and a bottom, so that it will readily pass downwardly into the ice-chamber and rest upon the supporting-blocks.

An opening is formed through the front wall 11 in line with the outlet-elbow 10, a pipe-nipple 12 is inserted through this opening, a rubber-washer 13 is placed upon the inner end of the nipple 12 and then the nipple 12 is screwed into the elbow, a rubber washer 14 is placed upon the outer end of the pipe nipple 12, a sleeve-coupling 15 is screwed upon the nipple 12 against the washer 14 thus drawing the washers 13 and 14 tightly against the faces of the wall 11, and a faucet 16 is screwed into the sleeve-coupling 15. A second opening is formed through the rear wall 17 of the ice-chamber in line with the inlet-elbow 7, a pipe nipple 18 is inserted through this opening, a rubber-washer 19 is placed upon the inner end of the nipple 18 and the nipple 18 is screwed into the elbow 7, a rubber washer 20 is placed upon the outer end of the nipple 18 and a fitting 21 is screwed upon the outer end of the nipple 18 against the washer 20, so as to draw the washers 19 and 20 tight against the faces of the rear wall 17, and the supply-pipe 22 is connected to the fitting 21.

The drip-basin 23 is secured to the front face of the wall 11 under the faucet 16, and has a trap-drain 24 leading downwardly to the fitting 25, an opening is formed through the front wall 11 in line with the fitting 25, a pipe-nipple 26 is prepared with an elbow 27 and a drain nipple 28, a rubber washer 29 is placed upon the nipple 26 against the elbow and the nipple 26 is inserted through the front wall 11, a rubber washer 30 is placed upon the outer end of the nipple 26 and the nipple 26 screwed into the fitting 25 thus drawing the washers 29 and 30 together against the faces of the wall 11.

Thus I have produced a box-shaped coil which may be readily inserted downwardly into the ice-chamber and connected and which may be readily disconnected and removed, and a drip-basin which drains into the ice-chamber, and I have produced tight joints for the coil and drip-basin which may be readily attached and detached. When the ice-chamber is filled with chopped ice the coil is entirely submerged in ice, and when the ice-chamber is filled with block ice the ice will contact directly with the sides and bottom of the coil. In this way I provide the largest possible amount of cooling coil surface in the least space. The coil is held up from the bottom of the drip pan so that the drip pan may be flushed and cleaned without removing the coil.

I claim:

1. In a water cooler, walls forming an ice chamber, a coil in the ice chamber; there being openings through the walls at the ends of the coil; a fitting upon the lower end of the coil, a nipple extending from the fitting through one of said openings, a washer upon the nipple between the fitting and the inner face of the wall, a second washer upon the nipple against the outer face of the wall, and a sleeve upon the outer end of the nipple against the second washer, so that by tightening the sleeve the washers are tightened against the wall.

2. In a water cooler, an ice box, a drip pan secured to the outer face of the ice box, a trap drain secured to the drip pan, a sleeve upon the lower end of the trap drain, a nipple extending from the sleeve through the wall of the ice box, a washer upon the nipple between the sleeve and the outer face of the wall, a second washer upon the nipple against the inner face of the wall, and a fitting upon the inner end of the nipple against the second washer, so that by tightening the sleeve a tight joint is made to prevent the ice box from leaking.

JAMES S. PRATT.

Witnesses:
ESTELLE M. LE SAGE,
BESSIE B. GOLDMAN.